United States Patent
Bogart

(10) Patent No.: US 11,817,690 B2
(45) Date of Patent: Nov. 14, 2023

(54) UTILITY JUNCTION BOX

(71) Applicant: Michael Murray Bogart, Boynton Beach, FL (US)

(72) Inventor: Michael Murray Bogart, Boynton Beach, FL (US)

( * ) Notice: Subject to any disclaimer, the term of this patent is extended or adjusted under 35 U.S.C. 154(b) by 187 days.

(21) Appl. No.: 17/362,433

(22) Filed: Jun. 29, 2021

(65) Prior Publication Data

US 2022/0014003 A1  Jan. 13, 2022

Related U.S. Application Data

(60) Provisional application No. 63/048,666, filed on Jul. 7, 2020.

(51) Int. Cl.
*H02G 3/08* (2006.01)

(52) U.S. Cl.
CPC ............ *H02G 3/088* (2013.01); *H02G 3/083* (2013.01)

(58) Field of Classification Search
CPC .......... H02G 3/088; H02G 3/083; H02G 3/18; H02G 3/126
USPC ......................................................... 220/3.2
See application file for complete search history.

(56) References Cited

U.S. PATENT DOCUMENTS

| | | | | |
|---|---|---|---|---|
| 1,861,074 | A * | 5/1932 | Adell ..................... | H02G 3/126 220/3.9 |
| 2,730,261 | A * | 1/1956 | Tutt ....................... | H02G 3/126 220/3.9 |
| 5,839,594 | A * | 11/1998 | Barbour .................. | H02G 3/22 220/3.7 |
| 6,956,170 | B1 * | 10/2005 | Gretz ..................... | F04D 29/601 174/58 |
| 10,938,194 | B1 * | 3/2021 | Holleschau ............ | H02G 3/081 |
| 2010/0230127 | A1 * | 9/2010 | Rodenberg ............. | H02G 3/126 174/50 |
| 2010/0270071 | A1 * | 10/2010 | Plankell ................. | H02G 3/126 174/502 |
| 2011/0083871 | A1 * | 4/2011 | Lalancette ............. | H02G 3/123 174/50 |
| 2018/0054050 | A1 * | 2/2018 | Thomas ................. | H02G 3/088 |
| 2018/0059348 | A1 * | 3/2018 | Burkett ................ | G02B 6/4441 |
| 2021/0384715 | A1 * | 12/2021 | Bogart ................... | H02G 3/088 |
| 2021/0408774 | A1 * | 12/2021 | Hellige .................... | H02G 3/18 |

FOREIGN PATENT DOCUMENTS

JP        2017200282 A  * 11/2017

* cited by examiner

*Primary Examiner* — J. Gregory Pickett
*Assistant Examiner* — Niki M Eloshway
(74) *Attorney, Agent, or Firm* — Michael J. Corrigan

(57) ABSTRACT

There is provided a utility junction box including a first housing portion with three sidewalls, a top sidewall, a rear access opening with a removable access cover, and an open bottom opening into an interior volume for receiving at least one line from a first location, and a second housing portion forming a weather guard extending cantilever style from the top sidewall and the three sidewalls including a sloping front face, a front wall, and a lower sidewall formed with a plurality of openings facing downwards, wherein each opening formed in the lower sidewall of the weather guard is configured to allow at least one utility line to pass from within the interior volume of the housing through the opening and direct the utility line through the opening formed in the lower sidewall of the weather guard to a second location exterior to the utility junction box.

12 Claims, 2 Drawing Sheets

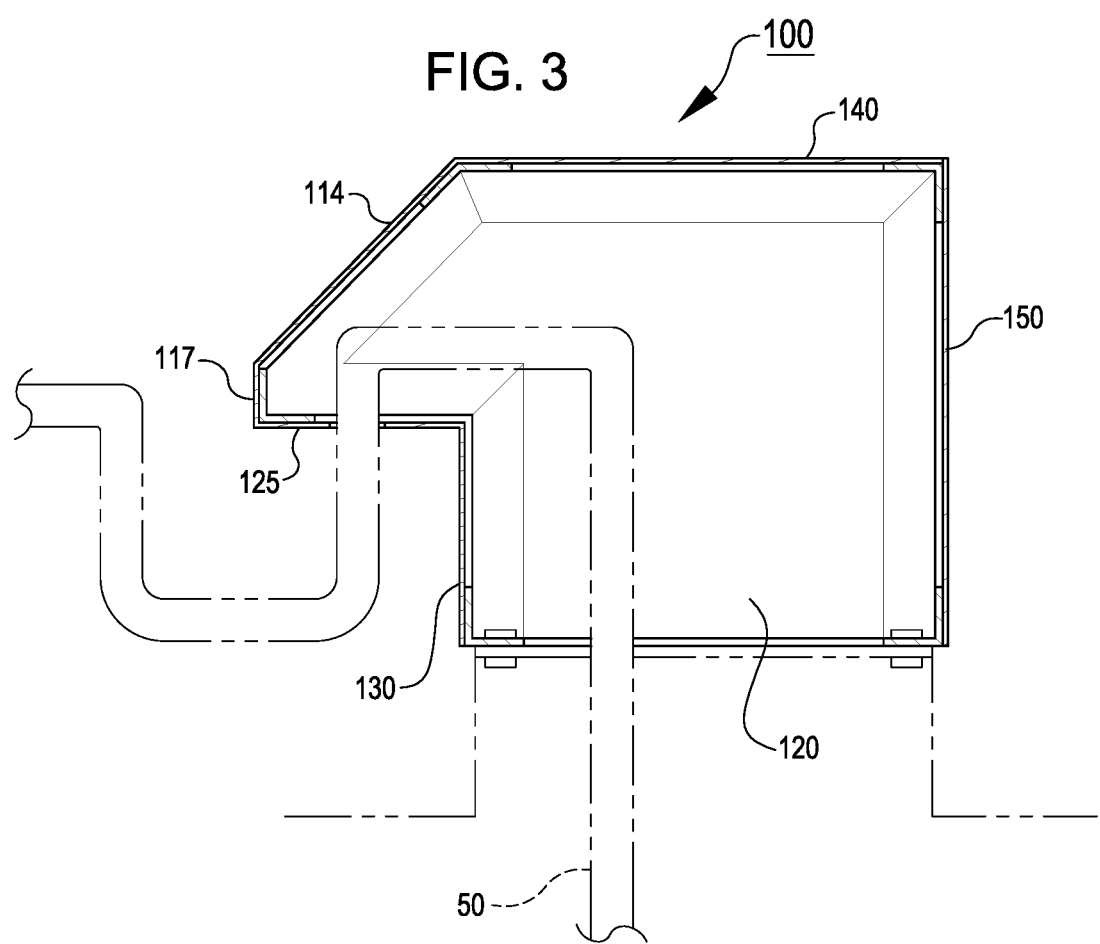

UTILITY JUNCTION BOX

RELATED APPLICATIONS

This application claims benefit of U.S. provisional patent application No. 63/048,666 filed on Jul. 7, 2020.

FIELD OF THE INVENTION

The present invention relates to building materials and components, and more particularly, to an improved utility junction box for connecting and housing utility lines and components for installation on the exterior of a structure or other installation.

BACKGROUND OF THE INVENTION

Utility junction boxes for connecting and housing utility lines and components on the exterior of a structure such as a roof, plaza deck, parking deck terrace levee, or on the ground or other location are known in the art. Typically, these utility junction boxes protect the utility lines and connections from corrosion and damage from weather such as rain, wind and storms. Such utility junction boxes suffer from drawbacks such as degradation over time from corrosion and weather and can begin to leak causing utility line connections and components to be damaged, leaks into the building structure, are not easy to access within for repairs, and are not designed for extreme weather climates having hurricanes, hail, high winds and potential for high velocity missile impact damage resulting in costly repairs. The present invention overcomes and prevents these drawbacks and others not addressed by the prior art.

SUMMARY OF THE INVENTION

In an embodiment, there is provided a utility junction box including a first housing portion with three sidewalls, a top sidewall, a rear access opening with a removable access cover, and an open bottom opening into an interior volume for receiving at least one line from a first location, and a second housing portion forming a weather guard extending cantilever style from the top sidewall and the three sidewalls including a sloping front face, a front wall, and a lower sidewall formed with a plurality of openings facing downwards, wherein each opening formed in the lower sidewall of the weather guard is configured to allow at least one utility line to pass from within the interior volume of the housing through the opening and direct the utility line through the opening formed in the lower sidewall of the weather guard to a second location exterior to the utility junction box.

In an embodiment, there is provided a utility junction box including a first housing portion with four sidewalls and a top sidewall, and wherein one of the four sidewalls is a removable access cover, and an open bottom opening into an interior volume for receiving at least one line from a first location, a second housing portion forming a weather guard extending cantilever style from the top sidewall and the three sidewalls including a sloping front face, a front wall, and a lower sidewall formed with a plurality of openings facing downwards, wherein each opening formed in the lower sidewall of the weather guard is configured to allow at least one utility line to pass from within the interior volume of the housing through the opening and direct the utility line through the opening formed in the lower sidewall of the weather guard to a second location exterior to the utility junction box.

DESCRIPTION OF THE DRAWINGS

FIG. 3 is a sectional view of the utility junction box illustrated in and taken along line 3-3 of FIG. 2.

DETAILED DESCRIPTION

Figure 1:
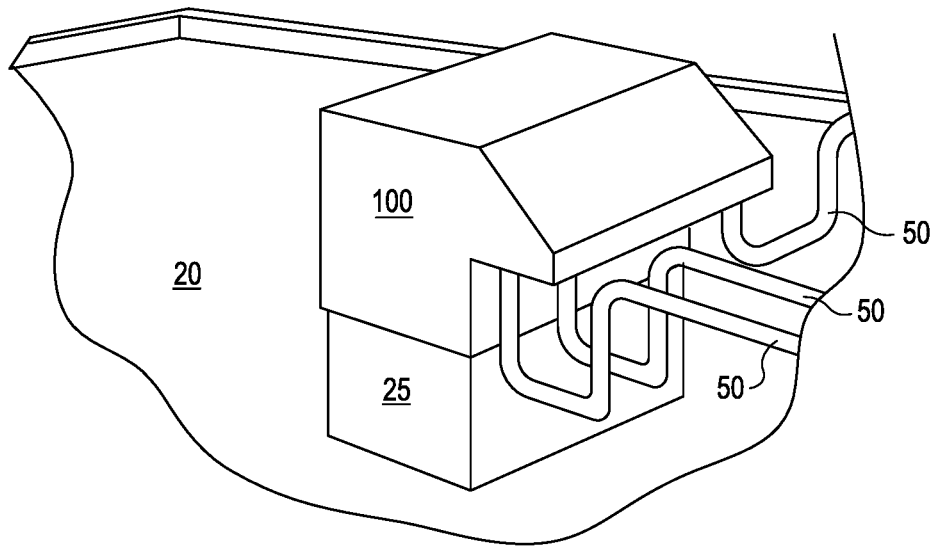
FIG. 1 is a perspective view of an embodiment of an improved utility junction box installed on a rooftop constructed according to the teachings of the present invention.
Figure 2:
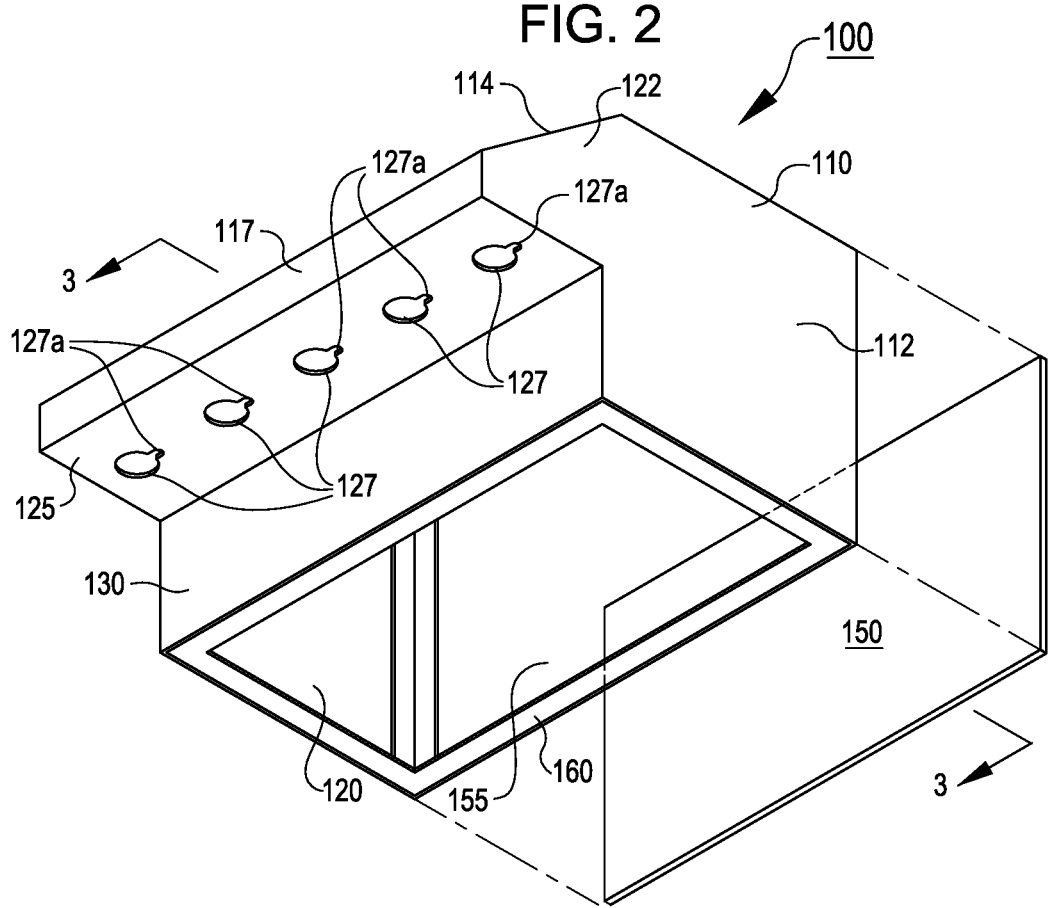
FIG. 2 is a partially exploded bottom perspective view of the utility junction box illustrated in FIG. 1.

Referring now to FIGS. 1 and 2, an improved utility junction box 100 known in the construction industry as a roof jack is constructed according to the teachings of one embodiment of the present invention is illustrated. The utility junction box 100 is used to house and flash plumbing, natural gas, propane, electrical and/or air conditioning (alternately refrigeration) components (not shown) including or connected to piping, tubing and lines such as plumbing, natural gas, propane, air conditioning and electrical lines coming from within a structure or another source to additional utility components on the exterior of the structure or other location.

The utility junction box 100 comprises a housing assembly made from sheets of materials including weather resistant metals such aluminum or stainless steel formed into a housing having a first housing portion 112 with three sidewalls 110, 120, 130, a top sidewall 140 (FIG. 3), a rear access opening with a removable access cover 150, an open bottom 155 ringed by an inwardly directed flange 160 attached to the sidewalls 110, 120, 130. The access cover 150 may be affixed to the first housing portion 112 with fastening means such as screws, bolts, latches, hinges, etc. Alternately, any one of the sidewalls 110, 120, 130 or top sidewall 140 may be substituted as the access cover opening into the interior of the first housing portion 112 and affixed thereto with fastening means such as screws, bolts, latches, hinges, etc. Extending from the top sidewall 140 (FIG. 3) and sidewalls 110, 120 is a second housing portion 122 forming a weather guard extending cantilever style comprising a sloping front face 114, a front wall 117, and a lower sidewall 125 formed with a plurality of openings 127 facing downwards.

Referring now also to FIG. 3, a typical installation of the utility junction box 100 on a roof 20 of a structure is illustrated. The utility line(s) 50 emanating from within the structure through an opening in the roof 20 typically are routed through a chase 25 that opens into the open bottom 155 of the first housing portion 112. The utility line(s) 50 may be further connected to other utility components (not shown) inside the utility junction box 100 before being further directed through the openings 127 before being further directed to additional utility components on the exterior of the structure or other second location. The sloping face 114 of the second housing portion 122 directs the utility lines 50 downward through the openings 127 in the bottom wall 125 of the overhang to provide additional protection to the components (not shown) and utility line(s) 50 contained within the composite housing 112, 122 from weather and wind especially in climates where hurricanes, tropical storms and high winds are common. The openings 127 may include an additional arcuate portion 127a for an additional utility line(s) to pass through the arcuate portions 127*a* such as a smaller diameter air conditioning return line (not shown). Sealant or gaskets may be used in the openings 127, 127*a* to prevent water or wind leakage through the openings 127, 127*a*.

In an embodiment, the exterior of the utility junction box 100 may be coated with a water and wind proofing material such as Wetsuit® or a ceramic or other coating that provides protection from sunlight and heat. The interior of the utility junction box 100 may be lined or coated with a soundproofing material to reduce noise emanating from within. The utility junction box 100 may be any shape including square, rectangular, round or any other shape.

Thus, there has been shown and described several embodiments of a utility junction box. As is evident from the foregoing description, certain aspects of the present invention are not limited by the particular details of the examples illustrated herein, and it is therefore contemplated those other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A utility junction box, comprising:
   a first housing portion with three sidewalls, a top sidewall non-removably affixed to the three sidewalls, a rear access opening with a removable access cover, and an open bottom opening into an interior volume for receiving at least one utility line from a first location; and
   a second housing portion forming a weather guard extending cantilever style from the top sidewall including a sloping front face extending from the top sidewall and non-removably affixed to two of the sidewalls, a front wall non-removably affixed to the sloping front face, and a lower sidewall formed with a plurality of openings facing downwards;
   wherein each opening formed in the lower sidewall of the weather guard is configured to allow at least one utility line to pass from within the interior volume of the housing through the opening and direct the utility line through the opening formed in the lower sidewall of the weather guard to a second location exterior to the utility junction box.

2. The utility junction box of claim 1, wherein the three sidewalls, top sidewall, access cover, sloping front face, front wall, and the lower sidewall are formed from a weather resistant material including stainless steel and aluminum.

3. The utility junction box of claim 1, wherein the openings further include an additional arcuate portion configured to allow an additional utility line to pass through the arcuate portions including a smaller diameter air conditioning return line.

4. The utility junction box of claim 1, further including sealant or gaskets used in the openings to prevent water or wind leakage through the openings.

5. The utility junction box of claim 1, wherein an exterior of the utility junction box is coated with a water and wind proofing material or a ceramic or other coating that provides protection from sunlight and heat.

6. The utility junction box of claim 1, wherein an interior of the utility junction box is lined or coated with a soundproofing material to reduce noise emanating from within.

7. A utility junction box, comprising:
   a first housing portion with four sidewalls and a top sidewall non-removably affixed to three of the sidewalls, and wherein one of the four sidewalls is a removable access cover, and an open bottom opening into an interior volume for receiving at least one utility line from a first location; and
   a second housing portion forming a weather guard extending cantilever style from the top sidewall including a sloping front face extending from the top sidewall and non-removably affixed to two of the sidewalls, a front wall non-removably affixed to the sloping front face, and a lower sidewall formed with a plurality of openings facing downwards;
   wherein each opening formed in the lower sidewall of the weather guard is configured to allow at least one utility line to pass from within the interior volume of the housing through the opening and direct the utility line through the opening formed in the lower sidewall of the weather guard to a second location exterior to the utility junction box.

8. The utility junction box of claim 7, wherein the three sidewalls, top sidewall, access cover, sloping front face, front wall, and the lower sidewall are formed from a weather resistant material including stainless steel and aluminum.

9. The utility junction box of claim 7, wherein the openings further include an additional arcuate portion configured to allow an additional utility line to pass through the arcuate portions including a smaller diameter air conditioning return line.

10. The utility junction box of claim 7, further including sealant or gaskets used in the openings to prevent water or wind leakage through the openings.

11. The utility junction box of claim 7, wherein an exterior of the utility junction box is coated with a water and wind proofing material or a ceramic or other coating that provides protection from sunlight and heat.

12. The utility junction box of claim 7, wherein an interior of the utility junction box is lined or coated with a soundproofing material to reduce noise emanating from within.

* * * * *